(12) United States Patent
Enqvist

(10) Patent No.: US 8,468,059 B2
(45) Date of Patent: Jun. 18, 2013

(54) STORAGE-CABINET AND METHOD FOR SELLING FROZEN AND/OR REFRIGERATED GOODS FROM SUCH A LOCKED STORAGE-CABINET

(76) Inventor: Anders Enqvist, Stockholm (SE)

(*) Notice: Subject to any disclaimer, the term of this patent is extended or adjusted under 35 U.S.C. 154(b) by 883 days.

(21) Appl. No.: 11/920,391

(22) PCT Filed: May 19, 2006

(86) PCT No.: PCT/SE2006/000586
§ 371 (c)(1),
(2), (4) Date: Nov. 14, 2007

(87) PCT Pub. No.: WO2006/123987
PCT Pub. Date: Nov. 23, 2006

(65) Prior Publication Data
US 2009/0094127 A1 Apr. 9, 2009

(30) Foreign Application Priority Data
May 19, 2005 (SE) ...................................... 0501125

(51) Int. Cl.
*G06Q 20/00* (2012.01)
*G06K 5/00* (2006.01)
*G07G 1/12* (2006.01)
*G07G 5/00* (2006.01)
*G06F 7/08* (2006.01)
*G01G 23/38* (2006.01)

(52) U.S. Cl.
USPC .......... 705/23; 705/16; 705/24; 177/4; 177/5; 235/381; 235/382

(58) Field of Classification Search
USPC ........... 705/16, 20, 23, 24; 177/4, 5; 235/381, 235/382
See application file for complete search history.

(56) References Cited

U.S. PATENT DOCUMENTS 4,553,211 A * 11/1985 Kawasaki et al. ............. 700/236
4,629,090 A * 12/1986 Harris et al. ...................... 221/7
(Continued)

FOREIGN PATENT DOCUMENTS

DE 19716138 A1 10/1998
WO WO-96/31833 A1 10/1996
(Continued)

OTHER PUBLICATIONS

Henry Gilgoff. Stores cashing in with self-cashiers. (Nov. 10, 2002). Newsday. Retrieved from http://search.proquest.com/docview/279569962?accountid=14753.*

(Continued)

*Primary Examiner* — Scott Zare
(74) *Attorney, Agent, or Firm* — Schwegman Lundberg & Woessner, P.A.

(57) ABSTRACT

A storage cabinet for at least one of refrigerated and frozen goods for sale through that the cabinet door opens via entering of a door opening code in a payment terminal with scanning equipment for reading of codes which identify said goods. The goods which are purchased by lifting them out of the cabinet are scanned with the scanning equipment and are debited to a purchasing account associated with the door opening code. The cabinet is locked when the cabinet door closes. Further the cabinet rests on a weighing device. If a predetermined difference between the scanned goods' weight and the cabinet's weight occurs, the weight difference is registered in a transaction data file associated with the door opening code, wherein loss of goods is registered on a known purchasing account.

13 Claims, 3 Drawing Sheets

U.S. PATENT DOCUMENTS

| | | | | |
|---|---|---|---|---|
| 4,787,467 A * | 11/1988 | Johnson | | 177/50 |
| 4,791,411 A * | 12/1988 | Staar | | 340/568.1 |
| 5,640,002 A * | 6/1997 | Ruppert et al. | | 235/462.46 |
| 5,671,362 A * | 9/1997 | Cowe et al. | | 705/28 |
| 5,728,999 A * | 3/1998 | Teicher | | 235/381 |
| 6,032,128 A * | 2/2000 | Morrison et al. | | 705/23 |
| 6,102,162 A * | 8/2000 | Teicher | | 186/39 |
| 6,131,399 A * | 10/2000 | Hall | | 62/127 |
| 6,204,763 B1 | 3/2001 | Sone | | |
| 6,659,344 B2 * | 12/2003 | Otto et al. | | 235/381 |
| 6,687,680 B1 * | 2/2004 | Iguchi et al. | | 705/16 |
| 2003/0034390 A1 | 2/2003 | Linton et al. | | |
| 2003/0122667 A1 * | 7/2003 | Flynn | | 340/540 |
| 2005/0060246 A1 | 3/2005 | Lastinger et al. | | |
| 2005/0171854 A1 * | 8/2005 | Lyon | | 705/24 |
| 2005/0216120 A1 * | 9/2005 | Rosenberg et al. | | 700/244 |
| 2006/0169764 A1 * | 8/2006 | Ross et al. | | 235/375 |
| 2006/0247824 A1 * | 11/2006 | Walker et al. | | 700/241 |

FOREIGN PATENT DOCUMENTS

| | | |
|---|---|---|
| WO | WO-03/040914 A2 | 5/2003 |
| WO | WO-2005/015510 A1 | 2/2005 |
| WO | WO-2006/123987 A1 | 11/2006 |

OTHER PUBLICATIONS

PCT Application Serial No. PCT/SE2006/000586, International Search Report mailed Aug. 22, 2006, 3 pgs.

PCT Application Serial No. PCT/SE2006/000586, Written Opinion mailed Aug. 22, 2006, 4 pgs.

European Application Serial No. 06733421.9, Supplementary European Search Report mailed Feb. 3, 2011, 7 pgs.

* cited by examiner

STORAGE-CABINET AND METHOD FOR SELLING FROZEN AND/OR REFRIGERATED GOODS FROM SUCH A LOCKED STORAGE-CABINET

RELATED APPLICATIONS

This application is a nationalization under 35 U.S.C. 371 of PCT/SE2006/000586, filed May 19, 2006 and published as WO 2006/123987 A1 on Nov. 23, 2006; which claimed priority under 35 U.S.C. 119 to Sweden Patent Application Serial No. 0501125-9, filed May 19, 2005, which applications and publication are incorporated herein by reference and made a part hereof.

TECHNICAL FIELD

The present invention is related to a storage cabinet for at least one of refrigerated and frozen goods for sale through that a door of the cabinet opens via entering of a door opening code in a payment terminal with scanning equipment for reading of codes which identify said goods. The goods which are purchased by lifting them out of the cabinet are scanned with the scanning equipment and debited to a purchasing account associated with the door opening code. The cabinet is locked when the cabinet door closes, and it even rests on a weighing device, Further the invention relates to a process for purchase of goods from the cabinet.

BACKGROUND OF THE INVENTION

Food on the Job™ shops are a concept that simplifies for employees in a workplace access to lunch and snacks 24 hours per day. The concept comprises that in principle a "nearby shop" is established at a work place. The shop consists of refrigerators, freezers, microwave ovens and payment terminals. The practicalities with service, refilling and cleaning are taken care of by Food on the Job™. The employees of a company which uses the Food on the Job™ concept receive a personal payment card in, e.g., credit card format, which gives access to refrigerators and freezers when the card is drawn in the payment terminal.

Goods which are purchased through lifting them out of the refrigerator and/or freezer are read off by a bar code reader which registers a purchase.

An employer which uses Food on the Job™ for service to their employees takes on a minimum of administration, since Food on the Job™ takes care of most of the practical administration. Payment for purchase of goods occurs, e.g., through transfer from the employees salary account.

A problem which arises in Food on the Job™'s present concept is that loss of goods can occur. This can be from pure forgetfulness during scanning of goods or a fraudulent situation in that the purchaser fails to scan certain goods.

SUMMARY OF THE INVENTION

The invention according to the present description intends to register loss as well as in all practical degree prevent this during purchase in an automatic goods cabinet with locked cabinet doors.

In order to produce the said the invention provides a storage cabinet for at least one of refrigerated and frozen goods for sale through that a door of the cabinet is opened via entering of a door opening code in a payment terminal with scanning equipment for reading of codes which identify said goods. The goods which are purchased through lifting out of the cabinet are scanned with the scanning equipment and a purchasing account associated with the door opening code is debited. The cabinet is locked after the cabinet door has closed. The cabinet comprises an insert which holds goods on a weighing device and the payment terminal via goods data files has information on each goods' weight.

When a purchase is completed a calibration occurs, wherein the scanned goods' weight is compared with altered weight on the cabinet's insert, and if a predetermined difference between the scanned goods' weight and the inserts' weight with goods occurs the weight difference is registered in a transaction data file associated with the door opening code, wherein loss of goods is registered to a known purchasing account.

In another embodiment the payment terminal is arranged to print a receipt where a possible weight difference is indicated.

Yet another embodiment comprises that the payment terminal is connected to a sound and/or display alarm, which makes a noise when a predetermined weight difference occurs, wherein a purchaser is reminded that they have possibly forgotten to scan in one of the goods removed from the cabinet.

The present invention further provides a process for selling of goods from a locked storage cabinet for at least one of refrigerated or frozen goods through that a door of the cabinet is opened via entering of a door opening code in a payment terminal with scanning equipment for reading of codes which identify goods. The goods which are purchased through removing them from the cabinet are scanned with the scanning equipment and debited to a purchasing account associated with the door opening code. The cabinet is locked after the cabinet door has closed. The process comprises weighing of an insert holding goods in the cabinet by means of a weighing device;

providing information in the payment terminal with information on each goods' weight via goods data files;

calibrating of the weighing device when a purchase is completed, wherein the scanned goods' weight is compared with the changed weight of the insert with goods in the cabinet and registering a weight difference, if a predetermined difference between the scanned goods' weight and the weight of the insert occurs, in a transaction data file associated with the door opening code, wherein loss of goods is registered on a known purchasing account.

The present invention further comprises process embodiments in accordance with the attached dependent process claims for the storage cabinet.

BRIEF DESCRIPTION OF THE DRAWINGS

Continuous reference is made throughout the text to the attached drawing figures for a better understanding of the present invention with its embodiments and given examples, wherein.

DETAILED DESCRIPTION OF PREFERRED EMBODIMENTS

FOOD ON THE JOB™ relates to a concept which simply and easily gives access to Food & Drink 24 hours per day. The concept consists of goods, equipment and services. The goods are well known trademarks from large producers. The equipment is produced by Food on the Job™ and is essential for the system to function together with the service that a client receives.

Figure 1:
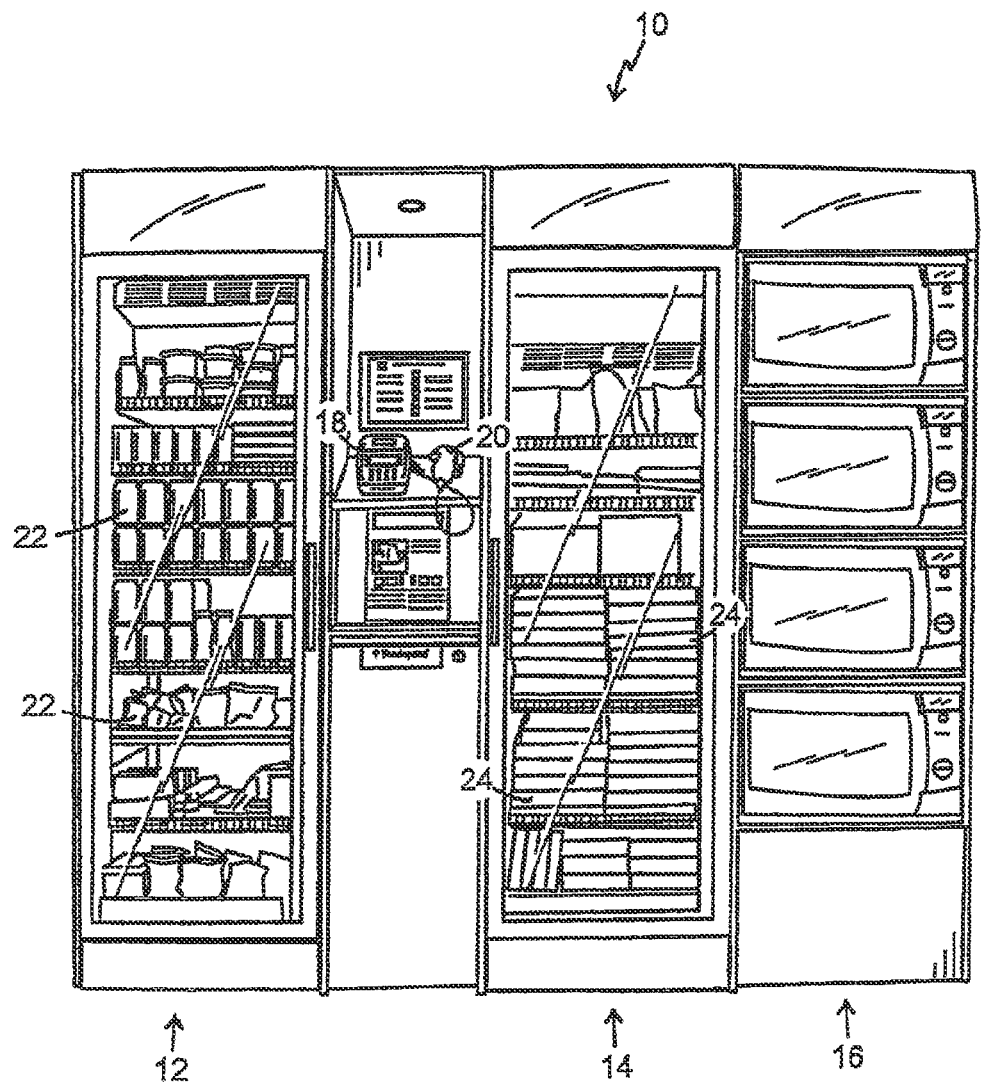
FIG. 1 illustrates a shop according to the background of the invention.

FIG. 1 illustrates a shop 10 according to the background of the invention. Food on the Job™-shop 10 according to the present invention comprises a refrigerator 12, freezer 14, with a locking device for each cabinet door, payment terminal 18 with scanner 20 and a rack/cabinet 16 with microwave ovens. All the equipment is built in a wood cabinet according to an embodiment.

The shop 10 is positioned in a work place/sales spot, wherein refrigerated and frozen goods 22, 24, respectively, are delivered to refrigerator and freezer 12, 14 with a delivery frequency based on use/sales from the cabinet 12, 14. In this connection, information is retrieved from the payment system/terminal 18. A consumer shops in the shop 10 with, e.g., a payment card, where they register or subscribe to the system on a form with approval for payment via e.g., a direct debit process, such as autogiro. In this way the consumer received access to purchase by drawing their payment card in the payment terminal 18. This is identified in a card register file and freezer/refrigerator doors are unlocked, wherein the consumer takes out the goods 22, 24 which they want to purchase and read the goods bar code with the scanner 20.

The payment system 18 has information via goods files on each goods weight. When the purchase is complete and the scale is stabile, a calibration is made where the scanned good is compared with the change in weight of the cabinets' 12, 14 contents according to the present invention. The cabinet door is locked, e.g., 25 seconds after the door has again closed through a time-relay function. Of a difference occurs the deviation is registered in a transaction file and the consumer is given a specified receipt for the purchase, if payment is not registered with, e.g. 80 seconds. Receipts can even be given of the client requests one via the terminal after correction of a completed purchase. In another embodiment the door is locked before a purchase is registered, that is, no time function determines when the door is locked after closing.

The service which is delivers with the Food on the Job™ concept comprises physical inventory of each cabinet 12, 14, 16 at regular intervals. Further attending to accounting and information to the consumer with sending of information, and payment occurs through bank transfer from the consumers salary account to Food on the Job's™ bank account or similar.

Figure 2:
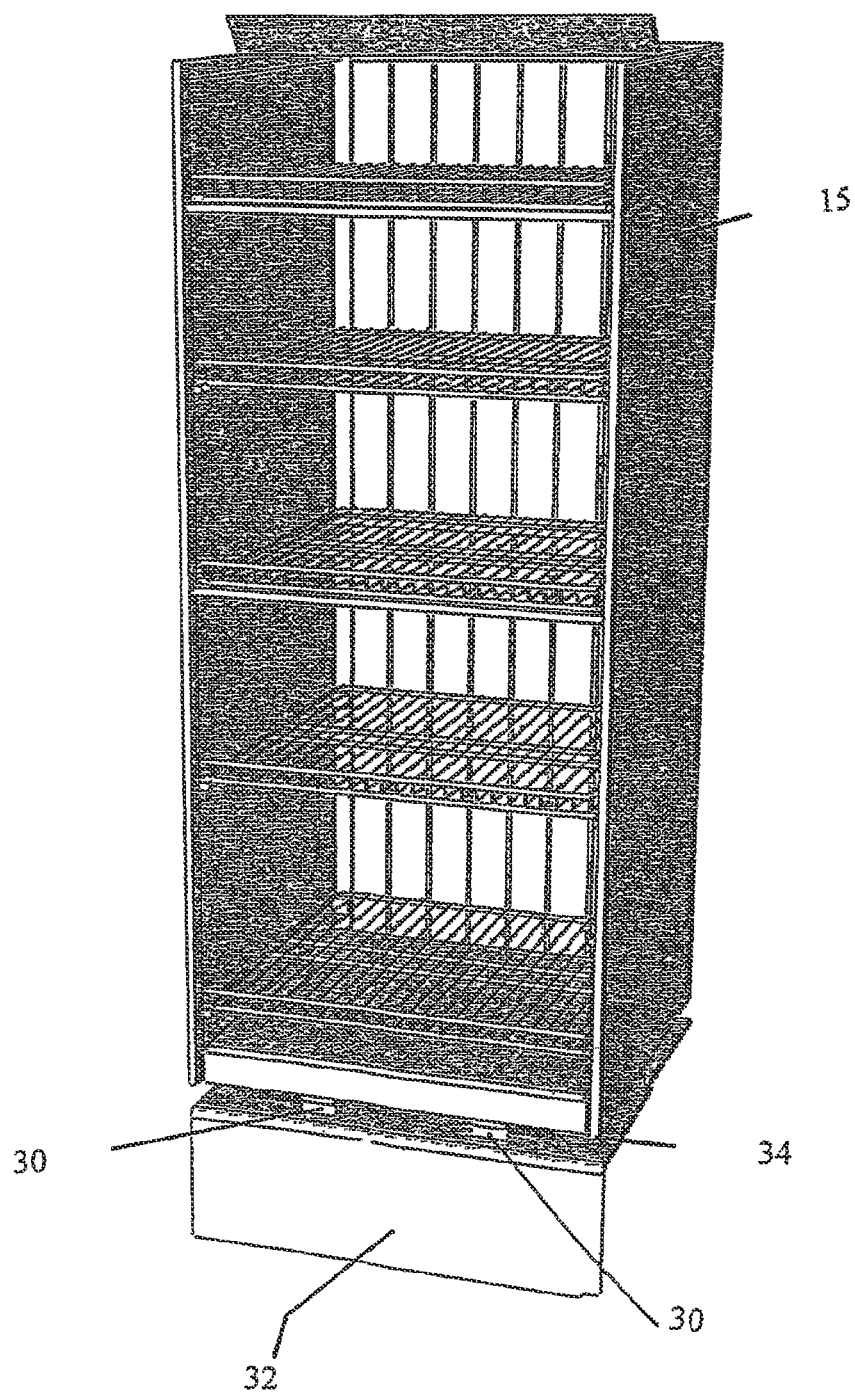
FIG. 2 illustrates a storage cabinet according to the present invention with weight sensor organizers.

FIG. 2 illustrates an insert 15 for holding of goods in a storage cabinet 12, 14 in an embodiment according to the present invention arranged above weight sensors 30 ("load cells") mounted in an adaptions support 32 with adaption plate 34 for weight sensors 30, wherein the weight sensors hold the insert 15 in the refrigerator or freezer 12, 14, respectively, wherein weight calibrations and weight differences are realized and registered when goods 22, 24 are taken from within the cabinet 12, 14 in order to be able to discover loss of goods 22, 24.

Weight sensors 30 are offered for sale by many companies, which is why the invention is not limited to the use of existing suppliers' products. The sensors which can be chosen for realizing the present invention as well as those presented herein are supplied by the company Revere Transducers Europe BV under the name "High accuracy load cell—type SHB" with model name SHBxR-50 kg-C3-SC.

Figure 3:
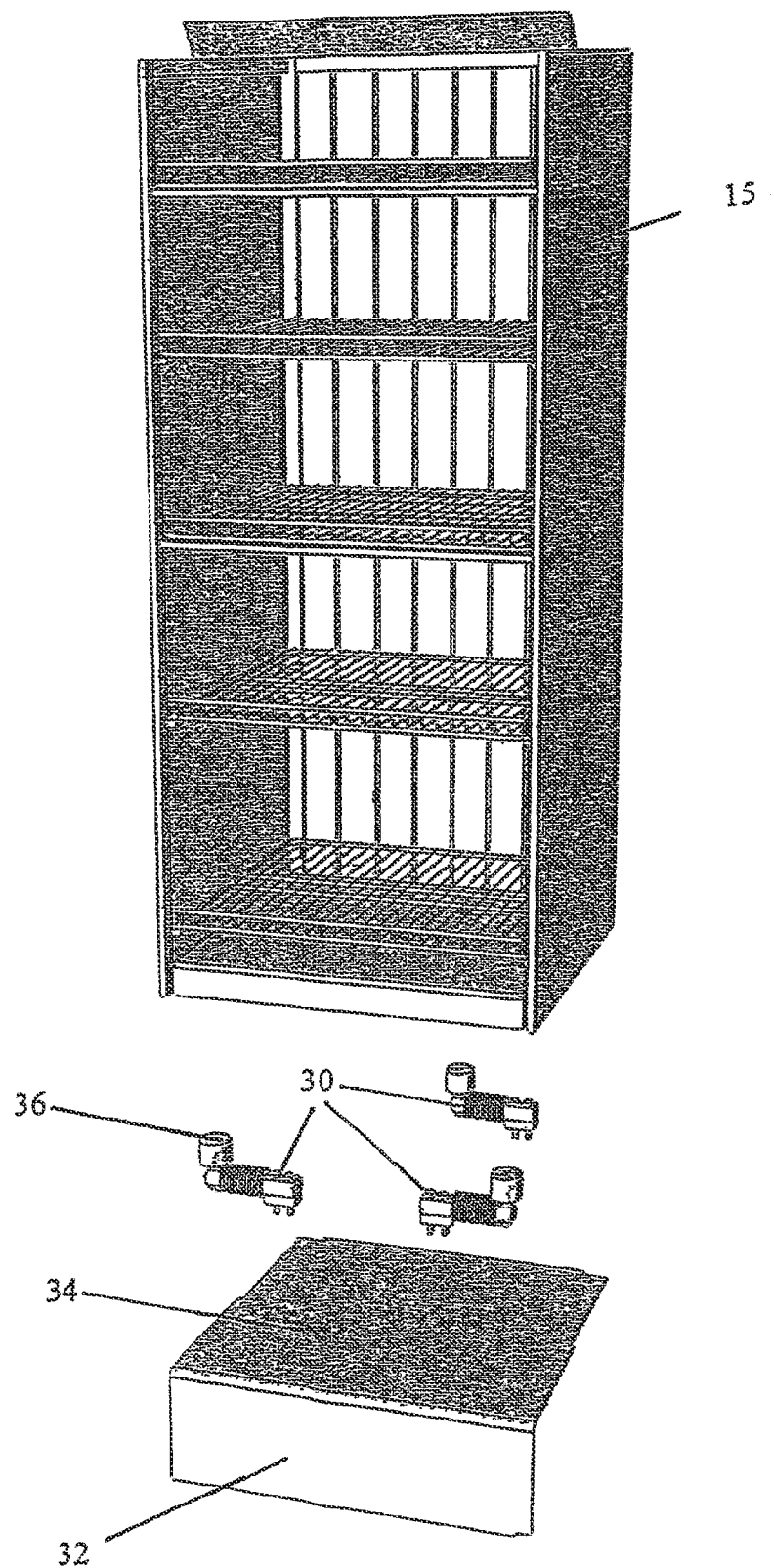
FIG. 3 illustrates a storage cabinet in exploded view according to FIG. 2.

FIG. 3 illustrates an insert 15 in a storage cabinet 12, 14 in exploded view according to FIG. 2, wherein it more easily shows how the weight sensors 30, here three in number, with pressure sensitive plungers 36 are placed in symmetry on the adaptions support 32 with adaptions plate 34. The symmetry is here related to the pistons 36 placement against the bottom plate of the insert 15 in the cabinet 12, 14. The weight sensors 30 are connected to the payment system 18 for electronic registering of weight differences as well as calibration (not shown). The skilled person within the technology field understand as mentioned that different weight devices than those shown here can be used for the same purpose as the weight sensors 30.

It has been shown that in order to obtain a better balance for weighing with the weight sensors 30 it is preferred to arrange said symmetrical with an odd number of sensors 30, here three, that is, three weight sensors 30 arranged in symmetry on the adaptions support 32 with its plate gives a more precise weighing (the weight is better distributed over the sensors) than a symmetry reached with four weight sensors 30.

In order to reach the said the invention herein provides a storage cabinet for at least one of refrigerated and frozen goods 12, 14, respectively, for sale though that the cabinet door is opened via entering of a door opening code in a payment terminal 18 with scanning equipment 20 for reading codes which identify goods 22, 24. The goods 22, 24 which are purchased by lifting them out of the cabinet are scanned with scanning equipment 20 and a purchase account associated with the door opening code is debited. The cabinet 12, 14 is locked when the cabinet door closes. The cabinet comprises an insert 15 which rests on a weight sensors 30 and the payment system 18 via goods data files has information on the weight of each good 22, 24.

When a purchase is completed a calibration occurs, wherein scanned goods' 22, 24 weight is compared with the changed weight of the insert 15 with goods in the cabinet 12, 14, and if a predetermined difference between the scanned goods' 22, 24 weight and the insert in the cabinets' 12, 14 weight occurs the weight difference is registered in a transactions data file associated with the door opening code, wherein loss of goods 22, 24 is registered on a known purchase account. The lowest predetermined weight difference in one embodiment consists of the good in the cabinet which weighs the least of all goods. Another embodiment comprises that a receipt is printed by the payment terminal 18 when a possible weight difference is noted. In a further embodiment it is provided that the payment terminal 18 is connected to sound and/or display alarm, which makes a noise when a predetermined weight difference occurs, wherein a purchaser is reminded that they have possibly forgotten to scan in one of the goods taken from the cabinet 12, 14.

The weighing device according to the present invention verifies whether a difference has occurred regardless if something has been removed from the cabinet, that is, of the cabinet door has opened. Further the weighing device tares zero weight and retrieves minus weight from goods file data for the god taken according to an embodiment of the present invention.

The weight difference tolerance can be calibrated for each sold good individually and registered in the goods file, for example a good which weighs 30 g can have an acceptable error tolerance/weight variation of ±2 g and a good which weighs 450 g can be allowed a error tolerance of ±10 g, while an error tolerance of ±30 g cannot be tolerated since one of the goods weighs only 30 g.

Payment terminals 18 communicate in one embodiment with a central server (not shown) for registering of purchases, need for refilling of the cabinet 12, 14 and other registerable date via a GSM connection (not shown) with the server.

According to the present invention en insert 15 has been placed on a weighing device. It is naturally even possible to weigh an entire cabinet 12, 14.

The present invention is not limited to the embodiments and given examples which are described herein, but rather it is the wording of the appended patent claims which specifies further embodiments for a skilled person within the field of technology.

The invention claimed is:

1. A storage cabinet for at least one of refrigerated and frozen goods for sale through that a door of the cabinet opens via entering of a door opening code in a payment terminal, the payment terminal including scanning equipment comprised in the payment terminal, the scanning equipment for reading of codes which identify said goods, wherein the goods which are purchased by lifting them out of the cabinet are scanned with the scanning equipment and are debited to a purchasing account associated with the door opening code, and wherein the cabinet is locked after the cabinet door has closed, comprising:
   an insert for holding goods in the cabinet and arranged resting on a weighing device;
   goods data files in the payment terminal with information on each good's weight;
   the weighing device when a purchase is completed is arranged to calibrate, wherein the scanned goods' weight is compared with the weight difference between the weight of the insert in the cabinet before the purchase and the weight of the insert in the cabinet after the purchase; and
   a transactions data file associated with the door opening code for registering of a weight difference if a predetermined difference between the scanned goods' weight and the weight difference between the weight of the insert before the purchase and the weight of the insert after the purchase occurs, wherein loss of goods is registered on a known purchasing account;
   wherein the payment terminal is one of:
   (1) configured to print a receipt when a predetermined weight difference occurs, the receipt including an indication of a reminder to a purchaser that they have possibly forgotten to scan one of the goods removed from the cabinet; or
   (2) connected to at least one of a sound alarm and a display alarm, wherein the at least one of a sound alarm and a display alarm is operable to make a noise when a predetermined weight difference occurs such that a purchaser is reminded by the at least one of the sound alarm or the display alarm that they have possibly forgotten to scan one of the goods removed from the cabinet.

2. A storage cabinet according to claim 1, wherein the weighing device comprises three weight sensors arranged in symmetry on an adaptor support with its plate, which produces a more precise weighing, wherein the weight is better divided over the sensors.

3. A process for selling of goods out of a locked storage cabinet for at least one of refrigerated and frozen goods through that a door of the cabinet opens via entering of a door opening code in a payment terminal, the payment terminal including scanning equipment comprised in the payment terminal, the scanning equipment for reading of codes which identify said goods, wherein the goods which are purchased by lifting them out of the cabinet are scanned with the scanning equipment and are debited to a purchasing account associated with the door opening code, and wherein the cabinet is locked after the cabinet door has closed, comprising:
   weighing of an insert holding goods in the cabinet;
   providing information in the payment terminal with information on each goods' weight via goods data files;
   calibrating of a weighing device when a purchase is completed, wherein the scanned goods' weight is compared with the weight difference between the weight of the insert in the cabinet before the purchase and the weight of the insert in the cabinet after the purchase; and
   registering a weight difference, if a predetermined difference between the scanned goods' weight and the weight difference between the weight of the insert before the purchase and the weight of the insert after the purchase occurs, in a transaction data file associated with the door opening code, wherein loss of goods is registered on a known purchasing account; and
said process including following
(1) printing of a receipt by the payment terminal when a predetermined weight difference occurs, the receipt including an indication of a reminder to a purchaser that they have possibly forgotten to scan one of the goods removed from the cabinet; or
(2) including connection of the payment terminal to at least one of a sound alarm and a display alarm, and operating at least one of the sound alarm or the display alarm to make a notice when a predetermined weight difference occurs, thereby reminding a purchaser by at least one of the sound alarm or the display alarm that they have possibly forgotten to scan one of the goods removed from the cabinet.

4. A process according to claim 3, characterised by the lowest said determined weight difference is comprised of the good in the cabinet which weighs the least of all goods.

5. A process according to claim 3, wherein the weight difference tolerances are calibrated for each individual good offered for sale and registered in the good data file.

6. A process according to claim 3, wherein arrangement of the weighing device comprises three weight sensors arranged in symmetry on an adaptor support with its plate, which produces a more precise weighing, wherein the weight is better divided over the sensors.

7. A process according to claim 3, comprising printing of a receipt by the payment terminal where a possible weight difference is noted.

8. A process according to claim 7, comprising making an alarm when a predetermined weight difference occurs to remind a purchaser that they have possibly forgotten to scan one of the goods removed from the cabinet.

9. A process according to claim 8, comprising calibrating the weight difference tolerances for each individual good offered for sale, and registering the calibrated weight difference in the goods data file.

10. A process according to claim 3, comprising weighing with at least three weight sensors to produce a precise weighing.

11. A process according to claim 3, comprising making an alarm when a predetermined weight difference occurs to remind a purchaser that they have possibly forgotten to scan one of the goods removed from the cabinet.

12. A process according to claim 11, comprising calibrating the weight difference tolerances for each individual good offered for sale, and registering the calibrated weight difference in the goods data file.

13. A process according to claim 12, comprising weighing with at least three weight sensors to produce a precise weighing.

* * * * *

UNITED STATES PATENT AND TRADEMARK OFFICE
CERTIFICATE OF CORRECTION

PATENT NO. : 8,468,059 B2  Page 1 of 1
APPLICATION NO. : 11/920391
DATED : June 18, 2013
INVENTOR(S) : Anders Enqvist It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this
Eighth Day of September, 2015

Michelle K. Lee
*Director of the United States Patent and Trademark Office*